(12) United States Patent
Herr-Rathke et al.

(10) Patent No.: US 9,120,365 B2
(45) Date of Patent: Sep. 1, 2015

(54) AUTOMATIC TEMPERATURE OVERRIDE PATTERN RECOGNITION SYSTEM

(71) Applicant: FORD GLOBAL TECHNOLOGIES, LLC, Dearborn, MI (US)

(72) Inventors: Jennifer A. Herr-Rathke, Plymouth, MI (US); Paul B. Hoke, Plymouth, MI (US); James R. Hurd, Canton, MI (US); Steven D. Errick, Bloomfield Hills, MI (US); Alan D. Wallington, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 157 days.

(21) Appl. No.: 14/100,614

(22) Filed: Dec. 9, 2013

(65) Prior Publication Data

US 2015/0158368 A1 Jun. 11, 2015

(51) Int. Cl.
*B60H 1/00* (2006.01)

(52) U.S. Cl.
CPC .................................. *B60H 1/00964* (2013.01)

(58) Field of Classification Search
CPC ........... B60H 1/00964; B60H 1/00814; B60H 1/00878; B60H 1/00892
USPC .................. 701/36, 49; 165/201, 202, 42, 43
See application file for complete search history.

(56) References Cited

U.S. PATENT DOCUMENTS

| 5,511,724 | A | 4/1996 | Freiberger et al. |
| 5,549,152 | A * | 8/1996 | Davis et al. .................. 165/201 |
| 6,173,902 | B1 | 1/2001 | Bauer et al. |
| 6,435,417 | B1 | 8/2002 | Holdgrewe et al. |
| 6,454,178 | B1 * | 9/2002 | Fusco et al. .................. 236/49.3 |
| 6,616,057 | B1 | 9/2003 | Kelly et al. |
| 8,903,593 | B1 * | 12/2014 | Addepalli et al. ........... 701/29.1 |
| 2013/0144486 | A1 * | 6/2013 | Ricci ............................... 701/36 |
| 2015/0120149 | A1 * | 4/2015 | Worrel et al. ................... 701/49 |

FOREIGN PATENT DOCUMENTS

EP 1418476 B1 12/2004

\* cited by examiner

*Primary Examiner* — Thomas G Black
*Assistant Examiner* — Sara Nelson
(74) *Attorney, Agent, or Firm* — Vichit Chea; MacMillan, Sobanski & Todd, LLC

(57) ABSTRACT

Each vehicle in a fleet comprises a climate controller having an auto mode. The auto mode controls climate actuators in response to a model relating sensed climate conditions to respective settings for the actuators. The vehicle has a buffer memory periodically storing sample vectors comprised of actuator/operation settings and sensed climate conditions. A user interface in the vehicle is responsive to a user override commands to modify respective operation settings while in auto mode. Each vehicle has a wireless communication system for sending data packages to a remote server when the user generates the override. Each data package is comprised of a plurality of stored sample vectors and an identification of the override command A central database associated with the remote server receives the data packages from the fleet vehicles in order to identify patterns within the received vectors that are associated with any given override command

14 Claims, 3 Drawing Sheets

AUTOMATIC TEMPERATURE OVERRIDE PATTERN RECOGNITION SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive climate control systems, and, more specifically, to a system and method for monitoring of an automatic temperature control mode and adjusting performance or developing corrective actions in response to user actions that override automatic settings to the climate control.

Heating, ventilating, and air conditioning (HVAC) systems control the climate in transportation vehicles such as automobiles in order to maintain thermal comfort of the vehicle occupants. Typically, a variable-speed blower passes air through heat exchangers and delivers conditioned air to various locations within the passenger cabin. Warm air may be provided by a heater core receiving heat from coolant flowing in a combustion engine, for example. Cool air may be obtained from a conventional air conditioning system having a motor driven compressor and an evaporator.

The simplest climate control systems in motor vehicles provide the occupant with direct control of the intensity of heating or cooling, the operating speed of the blower, the relative amount of air flow going to different registers, and the ratio of fresh air to recirculated air. This requires the user to continually monitor and adjust the climate control settings in order to remain comfortable.

Automatic temperature control systems have also been introduced wherein a feedback control system monitors ambient air temperature within the passenger compartment and other locations and automatically adjusts blower speed, airflow settings, and heater core or air conditioning operation to maintain a desired temperature setting. In some vehicles, multiple zones have been implemented with separate automatic temperature control with individual target temperature settings to being made for each zone.

A typical electronic automatic temperature control (EATC) system allows the user of the HVAC to select either manual control or an automatic control (Auto) mode. When Auto mode is selected, the EATC software utilizes numerous inputs to determine settings for the various outputs in order to maintain a user-specified temperature setpoint. In the event that the user desires an HVAC performance different from the settings made by Auto mode, the user interface continues to monitor for a user control action such as a button press to override one or more of the output settings and/or to change the temperature setpoint.

Sophisticated algorithms have been developed to help ensure that Auto mode properly responds to changing environmental and other conditions such as outside and inside temperatures, humidity, and sun load in order to provide thermal comfort for the occupants. Developing appropriate control algorithms (i.e., models) that are satisfactory to all typical users for each different model of vehicle is a complex task. Testing of the control system under every potential combination of conditions may be impractical or overly expensive. Moreover, user acceptance or non-acceptance of performance of a particular algorithm can only be discovered in general terms through surveys, warranty actions, or other broad characterizations. Thus, it would be desirable to better monitor user interaction with automatic controls.

SUMMARY OF THE INVENTION

In one aspect of the invention, a system is provided including a fleet of vehicles. Each vehicle comprises a climate controller having a manual mode and an auto mode. The auto mode controls climate actuators in the vehicle in response to a model relating sensed climate conditions in the vehicle to respective operation settings. The vehicle has a buffer memory periodically storing sample vectors comprised of respective operation settings and respective sensed climate conditions. A user interface in the vehicle is responsive to a user override commands to modify respective operation settings while in the auto mode. Each vehicle has a wireless communication system sending data packages to a remote server when the user generates an override command Each data package is comprised of a plurality of stored sample vectors and an identification of the override command A central database associated with the remote server receives the data packages from the fleet of vehicles in order to identify patterns within the received sample vectors that are associated with a same override command

DETAILED DESCRIPTION OF PREFERRED EMBODIMENTS

The present invention is applicable to any automatic temperature control system in a vehicle. One typical automatic system is shown in U.S. Pat. No. 5,549,152, to Davis, Jr., et al, which is hereby incorporated by reference in its entirety. Also incorporated by reference in its entirety is U.S. Pat. No. 6,454,178 to Fusco et al, which shows a controller for automatic temperature control wherein manual overrides of an automatic control are monitored and recorded. Based on recorded overrides, control coefficients in the controller are adaptively modified in order to optimize automatic performance for a particular user. However, the implementation of a localized adaptive control 1) requires additional computational resources and memory thereby increasing costs, and 2) neither identifies nor provides feedback to the vehicle designer/manufacturer of any deficiencies in the control model or in the user's understanding of the intended EATC operation.

Figure 1:
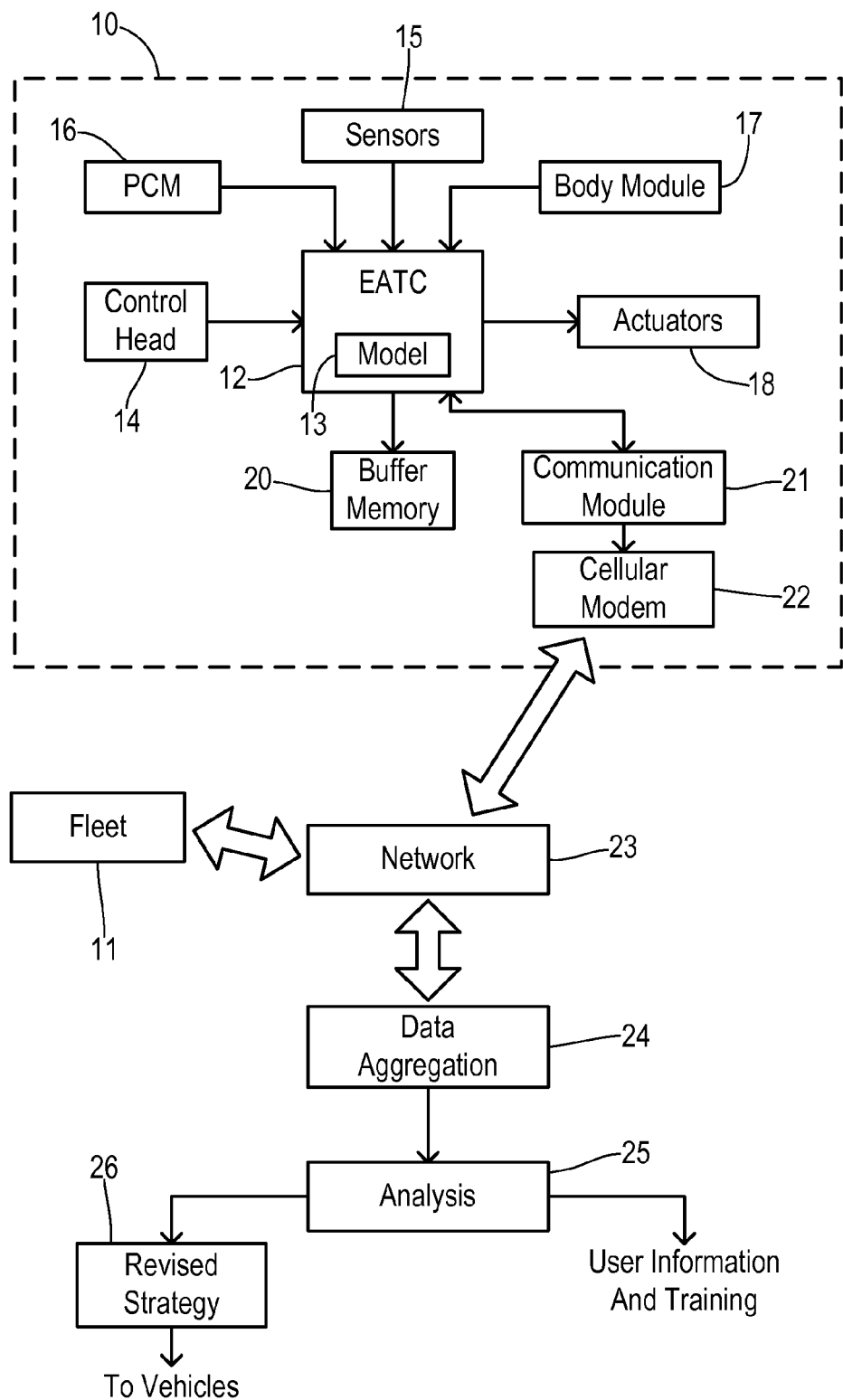
FIG. 1 is a block diagram of a vehicle fleet and central server according to one preferred embodiment of the invention.

Referring now to FIG. 1, a vehicle 10 equipped with an electronic automatic temperature control system is a member of a fleet of vehicles all similarly equipped, with the remainder of the fleet being represented by block 11. Vehicle 10 includes an EATC 12 including a model 13 which is used in an Auto mode as known in the art. A control head 14 is coupled to controller 12 which includes a user interface such as buttons and switches allowing a user to select either a manual control mode or the Auto mode. While in Auto mode, control head 14 remains responsive to the user in order to generate override commands.

Controller 12 responds to a variety of input signals from sensors 15, a powertrain control module (PCM) 16, a body module 17, and a communications module 21 for example. Sensors 15 may include left and right sunload sensors, an exterior (ambient) temperature sensor, an engine coolant temperature sensor, an in-car humidity sensor, a passenger compartment temperature sensor, various temperature sensors located in respective airflow ducts, as known in the art. PCM 16 may provide input data signals representing vehicle speed, engine speed, and a remote-start status signal. Body module 17 may provide other information signals such as the position of movable windows. A cellular communication module 21 provides a mobile device (e.g., phone) status signal to controller 12 to indicate when a voice call is in progress (e.g., for reducing blower speed during a call).

Based on the sensed signals and the received data signals, together with the current values for various controlled outputs of the EATC system (such as blend door position, recirculation setting status, airflow mode, and blower speed), controller 12 uses model 13 to derive operation settings for system hardware, such as a plurality of actuators 18. Actuators 18 may preferably include a variable-speed blower, airflow control doors (such as a blend door for varying the proportion of heated to cooled air and register control doors for selecting an air circulation mode for selectably delivering air to panel registers, floor duct, and/or defroster registers, for example). Actuators 18 may further include controllable elements or settings for the heating and cooling functions such as an engine coolant flow valve and an evaporator setpoint temperature.

During times that EATC 12 is using model 13 to implement appropriate settings for actuators 18 based on a user controlled temperature setpoint entered via control head 14, a periodic data collection is performed for storing the sensed environmental variables and current values of the operation/actuator settings in a buffer memory 20. More specifically, at each sample time, respective operation settings and respective sensed climate conditions are stored as a sample vector having a predetermined content and format. In a preferred embodiment, a new sample vector may be stored at a rate of once every 30 seconds, for example. Buffer memory 20 preferably has a size sufficient to record about 20 minutes of sample vectors (e.g., about 40 sample vectors). When a sample vector is collected after buffer memory 20 is already full, then the oldest sample vector is discarded.

When operating in the Auto mode and the user takes an action to generate an override command using control head 14, a data package comprised of 1) the sample vectors in buffer memory 20 and 2) an identification of the particular override command that was generated is assembled and sent to communication module 21. A cellular modem 22 in vehicle 10 as part of communication module 21 transmits the data package via a cellular network 23 to a server 24 that stores a central database and performs data aggregation of data packages from vehicle 10 and from other vehicles 11 in the fleet which likewise communicate with network 23. As described in more detail below, the data packages and the central database maintained on server 24 provide input data to an analysis block 25 for identifying patterns within the received sample vectors which are associated with a same override command Known software algorithms may be employed in analysis block 25 for detecting cause and effect patterns within the data. The identified patterns reveal customer behaviors exhibited across the vehicle fleet in response to similar environmental conditions. Depending on the identified patterns, a revised strategy 26 may be determined which can be implemented via a revised model which can be remotely transmitted back to vehicle 10 and other vehicles in fleet 11 to improve performance of the Auto mode. On the other hand, the identified patterns may instead indicate a widespread misunderstanding or misapprehension of proper automatic temperature control operation. In that case, revised user information and/or additional training materials may be developed for cascading to vehicle users so that the erroneous or unnecessary override commands can be avoided.

When a data package is assembled, the data preferably covers a single predetermined interval of substantially continuous operation in the Auto mode. If an override command is generated before buffer memory 20 becomes full, then only the sample vectors collected during the current instance of Auto mode operation should be included in the data package.

The data package also preferably includes a vehicle identification number (VIN) so that the data analysis can take into account other aspects of the vehicle, such as type of engine or trim level. Additional data may include on-board statistics such as the number of overrides generated per trip or the total number of overrides generated within the vehicle, so that the data analysis can discern whether the overrides are generated widely across the fleet or only by a small percentage of vehicles.

Figure 2:
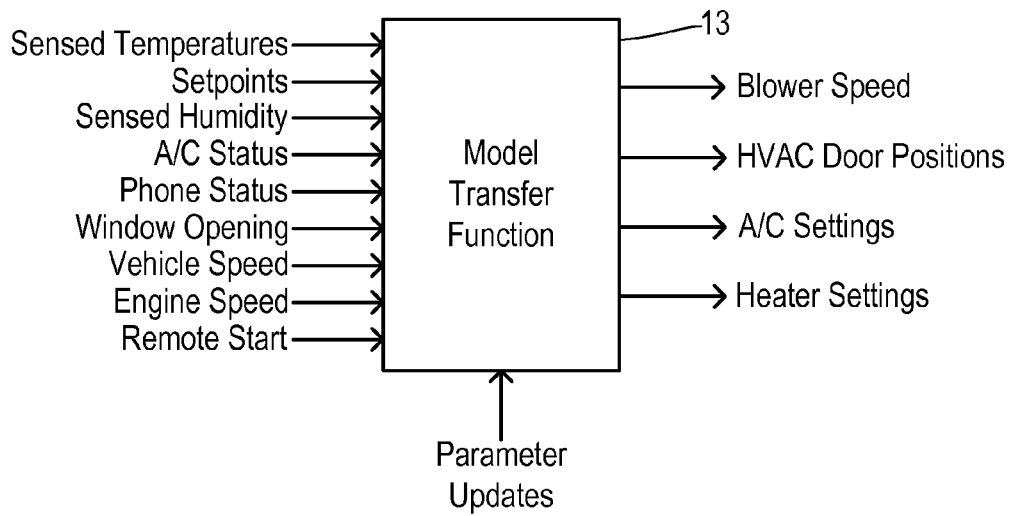
FIG. 2 represents an updatable model for an automatic mode of the invention.

FIG. 2 shows model 13 as a transfer function between a plurality of inputs and a plurality of outputs. The inputs may include sensed temperatures (such as ambient outside temperature, inside cabin temperature, and respective temperatures within panel ducts and floor ducts near the outlet registers or temperatures within heated or cooled seats), temperature setpoints (such as left or driver and right or passenger zone temperature settings), sensed humidity, sensed air quality, air conditioning status (e.g., on or off), phone status (e.g., call in progress), window opening positions, vehicle speed, engine speed, and remote start status. The outputs may include a blower speed command signal, HVAC door position command signals (e.g., for controlling air circulation modes such as defrost, floor, and panel registers, as well as a blend door setting, and a recirculation setting). Outputs may further include air conditioning settings such as a target evaporator temperature or a compressor duty cycle. The sensed inputs or outputs can also correspond to a rear-seat climate control system. Heater output settings from model 13 can also control the flow of engine coolant being delivered to a heater core. The transfer function in model 13 may be characterized by a plurality of parameters and/or rules that are developed as part of a vehicle model design. Parameter updates may be supplied to model transfer function 13 in order to modify the characteristics of the automatic temperature control function.

Figure 3:
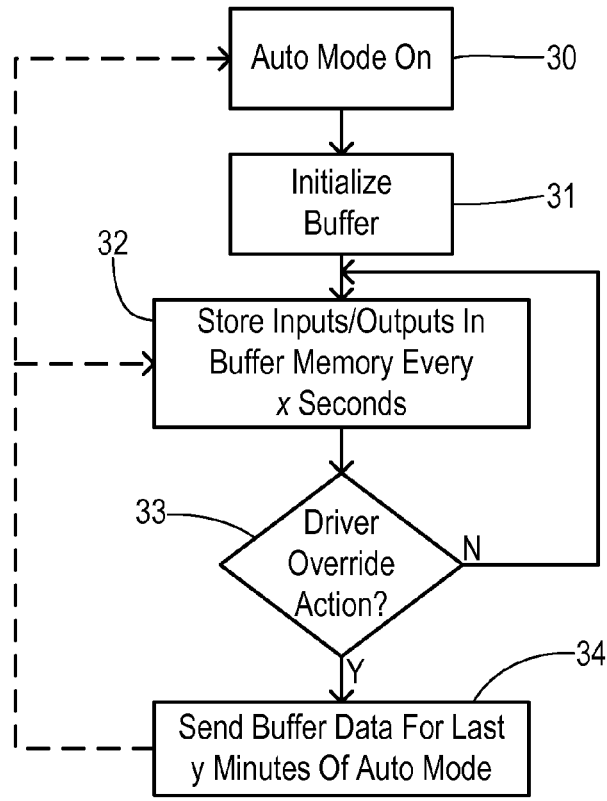
FIG. 3 is a flowchart showing one preferred on-board method of the invention.

FIG. 3 shows a preferred method to be performed within each individual vehicle. At step 30, the Auto mode of the climate control is turned on by the user. As used in the present invention, the Auto mode includes a semi-Auto mode wherein the driver may adopt a preset temperature while making a manual selection for the blower speed, for example. Thus, even though the blower speed has been manually set, the invention would continue to monitor for other types of overrides.

After the buffer memory is initialized in step 31 by deleting any old data, the climate control system periodically stores the inputs and outputs in step 32 that characterize overall environmental conditions and the EATC response as a sample vector in the buffer memory. A new sample vector is stored every x seconds (e.g., about every 30 seconds). A check is made in step 33 to determine whether the driver has initiated an override action. If not, then sample vectors continue to be collected at the predetermined rate in step 32. When a driver override action is detected, then buffer data comprised of a plurality of sample vectors together with an identifier of the specific override action that was taken by the driver are packaged into a data package covering the last y minutes of Auto mode. The data package is sent remotely to the central database in step 34. In a preferred embodiment, the data collection period y may be about 20 minutes. The user override command may be comprised of a blower speed change or an air circulation mode change, for example. Alternatively, an override command may also include the changing of an occupant's setpoint temperature, which may indicate that an occupant is not experiencing the expected comfort level based on their usual temperature setting.

Figure 4:
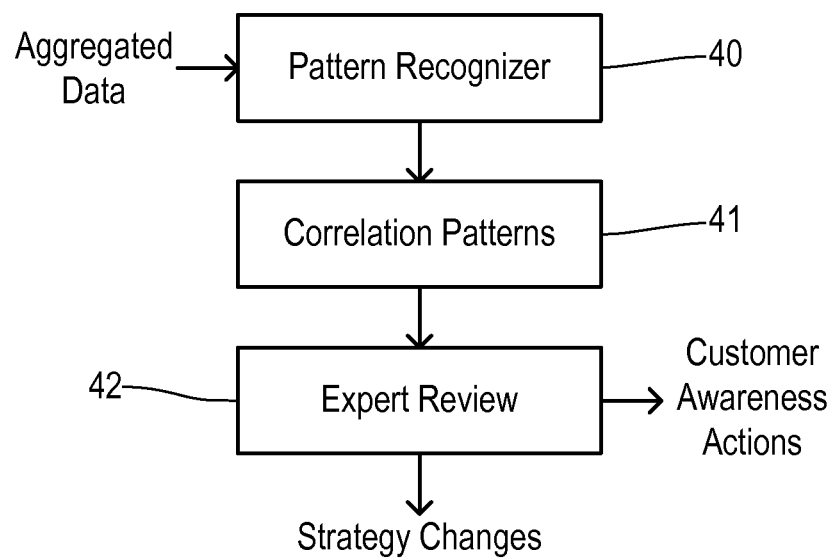
FIG. 4 is a flowchart showing one preferred off-board method of the invention.

Using the wireless communication system in each vehicle of the fleet, the central database located on a remote server as shown in FIG. 1 may be mined to reveal patterns in user behavior and/or deficiencies in Auto mode performance. As shown in FIG. 4, the aggregated data may be applied to a pattern recognizer 40. Using known statistical, mathematical, and other techniques, pattern recognizer 40 outputs correlation patterns 41 which define broad customer behavior patterns that appear under similar or identical conditions. Using the patterns, an expert review 41 determines whether a viable software change can be made in order to reduce or eliminate the user behaviors giving rise to the patterns. Strategy changes developed by expert review 42 may be captured in parameter updates that are then wirelessly returned to the models in each vehicle within the fleet. Alternatively, the expert review 42 may determine that a pattern 41 results from incorrect customer awareness of proper system operation. In that case, expert review 42 generates customer awareness actions such as modifications to the user manual or revised website information that may be published in order to better educate customers and/or the vehicle dealers on the proper use of the EATC system.

What is claimed is:

1. A system comprising:
    a fleet of vehicles, wherein each vehicle comprises:
        a climate controller having a manual mode and an auto mode, wherein the auto mode controls climate actuators in the vehicle in response to a model relating sensed climate conditions in the vehicle to respective operation settings;
        a buffer memory periodically storing sample vectors comprised of respective operation settings and respective sensed climate conditions;
        a user interface responsive to a user override commands to modify respective operation settings while in the auto mode; and
        a wireless communication system sending data packages to a remote server when the user generates the override command, wherein each data package is comprised of a plurality of stored sample vectors and an identification of the override command; and
    a central database associated with remote server receiving the data packages from the fleet of vehicles in order to identify patterns within the received sample vectors that are associated with a same override command 2. The system of claim 1 wherein the data package covers a predetermined interval of substantially continuous operation of the auto mode.

3. The system of claim 1 wherein the climate actuators include a variable-speed blower and a plurality of airflow control doors, wherein air circulated by the blower is distributed via ducts according to respective positions of the airflow control doors.

4. The system of claim 3 wherein the respective operation settings include a blower speed, an airflow mode, and a target duct temperature.

5. The system of claim 1 wherein the user override commands include a blower speed change and an air circulation mode change.

6. The system of claim 1 wherein the user override commands include an occupant setpoint temperature change.

7. The system of claim 1 further comprising:
    a modified model derived from the identified patterns and stored on the server, wherein the server forwards the modified model to climate controllers in the fleet of vehicles via the wireless communication systems, and wherein the climate controllers are configured to incorporate the modified model.

8. A method comprising the steps of:
    operating a plurality of climate controllers in a plurality of vehicles in an automatic temperature control mode, wherein the automatic mode uses a model relating sensed climate conditions in each respective vehicle to respective operation settings for respective climate actuators;
    periodically buffering in respective vehicle memories sample vectors, wherein each sample vector is comprised of respective operation settings and respective sensed climate conditions at respective sample times;
    detecting manual override commands in respective vehicles wherein a user modifies an actuator setting from a value set by the automatic mode;
    transmitting data packages to a remote server when a respective user generates one of the override commands, wherein each data package is comprised of a plurality of stored sample vectors and an identification of the corresponding override command;
    aggregating a plurality of data packages from at least some of the plurality of vehicles in a central database;
    identifying patterns within the sample vectors in the central database that are associated with a same override command; and
    identifying changes to the automatic temperature control mode to reduce a likelihood of future occurrence of the override command 9. The method of claim 8 wherein each data package covers a predetermined interval of substantially continuous operation of the auto mode in a respective vehicle.

10. The method of claim 8 wherein the climate actuators include a variable-speed blower and a plurality of airflow control doors, wherein air circulated by the blower is distributed via ducts according to respective positions of the airflow control doors.

11. The method of claim 10 wherein the respective operation settings include a blower speed, an airflow mode, and a target duct temperature.

12. The method of claim 8 wherein the user override commands include a blower speed change and an air circulation mode change.

13. The method of claim 8 wherein the user override commands include an occupant setpoint temperature change.

14. A method comprising:
    automatically controlling temperature in vehicles with a model for determining operation settings;
    storing sample vectors in respective vehicles of operation settings and sensed conditions at respective times;

wirelessly transmitting stored sample vectors and an identification of corresponding override commands to a server in response to an override command;
identifying patterns within the sample vectors and identifying changes to the model to reduce a likelihood of future occurrence of the override command

* * * * *